United States Patent Office 3,445,524
Patented May 20, 1969

3,445,524
FLUORINATED ALCOHOL AND ETHER DERIVATIVES THEREOF
Everett E. Gilbert and Benjamin Veldhuis, Morristown, N.J., assignors to Allied Chemical Corporation, New York, N.Y., a corporation of New York
No Drawing. Original application Sept. 14, 1965, Ser. No. 487,334, now Patent No. 3,352,928, dated Nov. 14, 1967. Divided and this application Aug. 1, 1967, Ser. No. 667,876
Int. Cl. C07c 43/12
U.S. Cl. 260—614     2 Claims

ABSTRACT OF THE DISCLOSURE

Methyl and ethyl derivatives of 1,1,3,3-tetrafluoro-2-propanol useful as general inhalation anesthetics.

---

This is a division of application Ser. No. 487,334, filed Sept. 14, 1965, and now Patent No. 3,352,928.

Fluorinated alcohols of various types, including 2,2,3,3-tetrafluoro-1-propanol, are known. 1,1,3,3-tetrafluoro-2-propanol, however, is a heretofore unknown alcohol having unusual and unexpected properties. This alcohol exhibits exceptionally high solubility for polyamides, such as nylon, and may be employed as solvent in polyamide-based adhesives. In such use, the alcohol has been found to be completely stable, even when the adhesives are subjected to elevated temperatures.

The novel methyl and ethyl either derivatives of this invention possess outstanding utility as general inhalation anesthetics when administered to anesthetic-susceptible organisms.

1,1,3,3-tetrafluoro-2-propanol, $HF_2C$—$CHOH$—$CF_2H$, is readily prepared by reacting 1,1,3,3-tetrafluoroacetone with sodium borohydride at temperature of about 10° to 50° C. in the presence of a solvent for the reactants, such as diethylene glycol dimethyl ether. After the reaction is complete, the reaction mixture is added to an aqueous sulfuric acid solution and distilled to give a mixture of water and the desired alcohol. The distillate is dehydrated and then subjected to vacuum distillation to yield the alcohol in pure form (boiling point about 109° C.).

The methyl and ethyl ether derivatives of this invention, $HF_2C$—$CHOCH_3$—$CF_2H$ (1,1,3,3 - tetrafluoroisopropyl methyl ether), and $HF_2C$—$CHOC_2H_5$—$CF_2H$ (1,1,3,3-tetrafluoroisopropyl ethyl ether), respectively, are readily prepared by reacting an aqueous solution of 1,1,3,3-tetrafluoro-2-propanol with sodium hydroxide and then with dimethyl or diethyl sulfate at temperature of about 0° to 50° C. The resulting oil layer is separated, dried and then distilled to give the desired ether derivative.

The following examples will serve to illustrate preparation of the novel alcohol and ether derivatives of this invention. In the examples, parts are by weight.

EXAMPLE 1

Production of 1,1,3,3-tetrafluoro-2-propanol 47 parts of sodium borohydride in 473 parts of diethylene glycol dimethyl ether were placed in a reaction vessel equipped with a mechanical stirrer. 520 parts of 1,1,3,3-tetrafluoroacetone were then added over a period of 2¾ hours at 20° C. The resulting reaction mixture was allowed to stand overnight and was then added to a mixture of 250 parts of water and 138 parts of concentrated sulfuric acid. Solid boric acid byproduct was filtered off, and the solution was distilled to give a mixture of water and 1,1,3,3-tetrafluoro-2-propanol boiling at about 104° C. Treatment of the distillate with anhydrous sodium sulfate gave 875 parts of a mixture of water and the alcohol having enhanced alcohol content. A 100 part aliquot of this mixture was dehydrated and purified by vacuum distillation (at 5 mm. Hg and 90° C.) from 200 parts of 100% sulfuric acid to yield 21 parts of crude anhydrous alcohol. Redistillation of the crude alcohol gave pure 1,1,3,3-tetrafluoro-2-propanol boiling at about 109° C.

Infrared spectrographic analysis of the alcohol showed OH absorption at 2.85 microns and $CF_2$ absorption at 8.6 to 9.7 microns. The structure of the alcohol was confirmed by nuclear magnetic resonance analysis.

Elemental analysis of the alcohol gave the following results.

Calculated: Fluorine, 57.6%; hydrogen, 3.0%. Found: Fluorine, 59.0%; hydrogen, 3.2%.

EXAMPLE 2

Production of 1,1,3,3-tetrafluoroisopropyl methyl ether

A mixture of 180 parts of water and 40 parts of 50% sodium hydroxide solution was placed in a reaction vessel provided with a mechanical stirrer. An aqueous solution of 85 parts of the crude alcohol prepared in Example 1 was then added over a period of 20 minutes at 20° C. 63 parts of dimethyl sulfate were next added over a 30 minute period at about 10° C. The resulting reaction mixture was warmed to 50° C. and held at this temperature for 50 minutes. An oil layer separated upon cooling. This layer was removed, dried over magnesium sulfate and then distilled to give 35 parts of 1,1,3,3-tetrafluoroisopropyl methyl ether having a boiling point of 81–81.5° C.

Infrared spectrographic analysis of the methyl ether derivative showed $CF_2$ absorption at 8.6 to 9.7 microns and ether linkage ($CH_3$—O—C) absorption at 9.8 to 10.1 microns. The structure of the methyl ether derivative was confirmed by nuclear magnetic resonance analysis.

Elemental analysis of the methyl ether derivative was as follows.

Calculated: Fluorine, 52.0%; hydrogen, 4.1%. Found: Fluorine, 50.7%; hydrogen, 4.1%.

EXAMPLE 3

Production of 1,1,3,3-tetrafluoroisopropyl ethyl ether

When the process of Example 2 is carried out using diethyl sulfate in place of dimethyl sulfate, 1,1,3,3-tetrafluoroisopropyl ethyl ether is obtained as product.

The alcohol of this invention gave a clear 15% solution of nylon 6 upon warming the components together on a steam bath at about 95° C. for several hours. The resulting solution was suitable for use as a nylon adhesive. When the known isomeric primary alcohol, 2,2,3,3-tetrafluoro-1-propanol, is used for the same purpose, it tends to become unstable, particularly at slightly elevated temperatures, releasing hydrogen fluoride during use. This presents a serious shortcoming of the primary alcohol. Furthermore, the primary alcohol fails completely to dissolve the high quantity of nylon which the alcohol of this invention dissolves with ease.

A standard test for evaluating the methyl ether derivative of this invention as an inhalation anesthetic was carried out. Details of the test, which is similar to that described by Robbins, J. Pharmacol, Exper. Therap., 86, 197–204 (1946), are as follows:

Ten mice (five in each of two 6.3 liter animal jars) were used for each dose level. A minimum of three graded doses, injected at 0.1 ml. per 10 seconds, was used to establish that dose which caused 50% of the mice to lose the righting reflex in five minutes. The concentration of anesthetic vapor in the jar was calculated using the ideal gas law (see Carson et al., Anesthesiology, 23, 187 (1962). The "$AD_{50}$" (volume percent of compound required to anesthetize 50% of the mice used) was determined by plotting the data on log-probit graph paper (see Miller et al., Proc. Soc. Exp. Biol. and Med., 57, 261 (1944)). Essentially the same experimental procedure was used to determine the "$LD_{50}$" (dosage required to kill 50% of the mice).

The "$AD_{50}$" obtained upon testing the methyl ether derivative was 1.40, and the "$LD_{50}$" obtained was $>10.3$. The "AI" (anesthetic index=$LD_{50} \div AD_{50}$) was, therefore, $>7.3$. The "AI" is a measure of the margin of toxic safety of the compound; the higher the number, the less toxic the compound relative to the dosage needed to induce anesthesia. The three most highly developed commercial fluorinated anesthetics ("Fluomar" (trifluoroisopropyl vinyl ether); "Roflurane" (2-bromo-2-fluoro-1,1-difluoroethyl ether); "Penthrane" (2,2-dichloro-1,1-difluoroethyl ether)) have "AI" values in the range of 3.3 to 4.5. It is apparent, therefore, that the methyl ether derivative possesses unusually low toxicity.

Since various changes and modifications may be made in the invention without departing from the spirit thereof, the invention is deemed to be limited only by the scope of the appended claims.

We claim:
1. 1,1,3,3-tetrafluoroisopropyl methyl ether.
2. 1,1,3,3-tetrafluoroisopropyl ethyl ether.

References Cited

UNITED STATES PATENTS 3,280,150 10/1966 England et al.
3,346,448 10/1967 Gilbert et al.

LEON ZITVER, *Primary Examiner.*

HOWARD T. MARS, *Assistant Examiner.*

U.S. Cl. X.R.
260—999